United States Patent [19]

Shoda et al.

[11] Patent Number: 5,343,193
[45] Date of Patent: Aug. 30, 1994

[54] MATRIX SWITCHER APPARATUS

[75] Inventors: Akihiko Shoda, Tokyo; Yoshinobu Usui; Tomoji Mizutani, both of Kanagawa, all of Japan

[73] Assignee: Sony Corporation, Tokyo, Japan

[21] Appl. No.: 71,324

[22] Filed: Jun. 2, 1993

Related U.S. Application Data

[63] Continuation of Ser. No. 673,668, Mar. 22, 1991, abandoned.

[30] Foreign Application Priority Data

Mar. 28, 1990 [JP] Japan .................. 2-080302

[51] Int. Cl.$^5$ ............................... H04Q 1/00
[52] U.S. Cl. .................... 340/825.79; 340/825.85; 379/306; 348/705
[58] Field of Search ............ 340/825.79, 825.8, 825.86, 340/825.85; 379/306; 358/181, 185

[56] References Cited

U.S. PATENT DOCUMENTS

| | | | |
|---|---|---|---|
| 3,321,745 | 5/1967 | Mansuetto | 340/825.86 |
| 3,786,425 | 1/1974 | Hetherington | 340/825.86 |
| 4,037,250 | 7/1977 | McGahan | 358/185 |
| 4,667,320 | 5/1987 | Onno et al. | 340/825.79 |
| 4,807,280 | 2/1989 | Posner et al. | |
| 4,817,082 | 3/1989 | Orsic | 340/825.85 |
| 4,829,511 | 5/1989 | Georgiou | 340/825.85 |
| 4,929,940 | 5/1990 | Franaszek | 340/825.8 |
| 5,107,489 | 4/1992 | Brown et al. | 340/825.79 |

FOREIGN PATENT DOCUMENTS

0336712 10/1989 European Pat. Off. .
2121611 11/1972 Fed. Rep. of Germany .

*Primary Examiner*—Donald J. Yusko
*Assistant Examiner*—Brian Zimmerman
*Attorney, Agent, or Firm*—William S. Frommer; Alvin Sinderbrand

[57] ABSTRACT

This invention provides a matrix switcher apparatus adapted to arbitrarily distribute signals in a plurality of input channels to a plurality of output channels. The matrix switcher apparatus includes a cross point matrix adapted for connecting one matrix switcher unit to any other matrix switcher unit or units to carry out expansion of input/output, and input and output terminals expandable up to a predetermined maximum number of channels. Further, this invention provides a matrix switcher apparatus comprising a first cross point matrix including a first group of input terminals to receive signals in a plurality of channels, and a first group of output terminals for at least some of the plurality of channels and a second group of output terminals for expansion to any other unit or units; and a second cross point matrix including a second group of input terminals coupled with the first group of output terminals and a third group of input terminals for receiving signals from one or more additional matrix switcher apparatus for expansion, and a third group of output terminals fewer in number than the plurality of channels, thereby making it possible to construct a matrix switching system on a compact scale or in any of a variety of scales, and to reduce its cost.

7 Claims, 5 Drawing Sheets

MATRIX SWITCHER APPARATUS

This application is a continuation of application Ser. No. 07/673,668, filed Mar. 22, 1991 now abandoned.

BACKGROUND OF THE INVENTION

1. Field of the Invention

This invention relates to a so called matrix switcher apparatus (matrix routing switcher apparatus) adapted to arbitrarily distribute a plurality of channels input thereto, e.g., for video signals or audio signals, etc. to a plurality of outputs thereof.

2. Description of the Related Art

Figure 1:
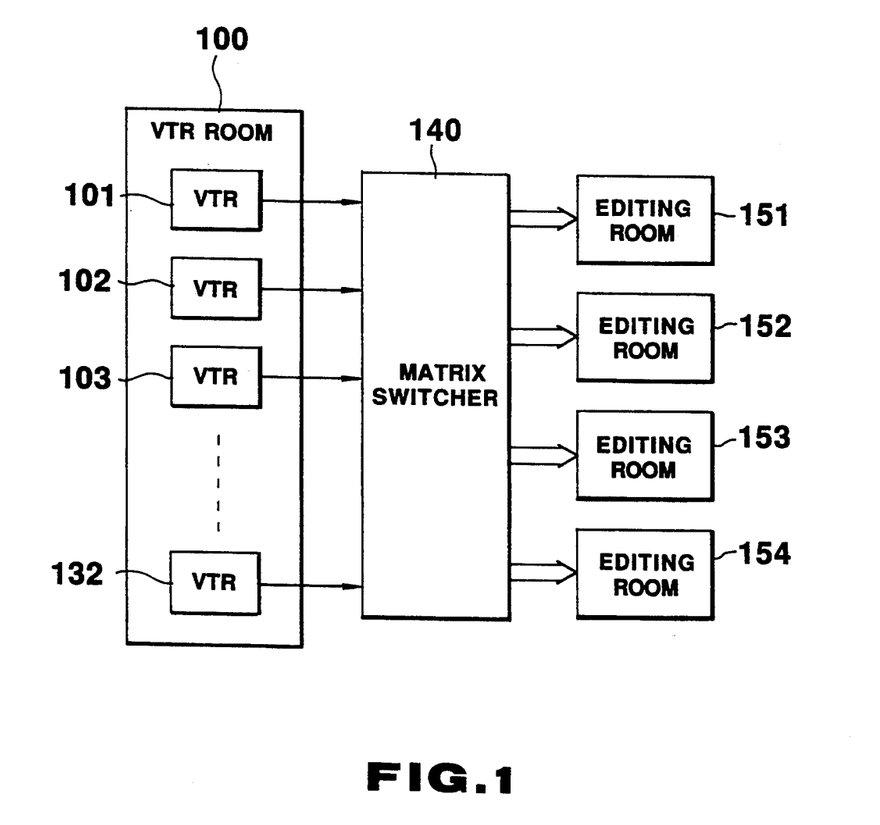
FIG. 1 is a block diagram for explaining how a matrix switcher apparatus is used.

At a location where a plurality of devices (e.g., video tape recorders (VTRs)) are employed to carry out, e.g., editing work, such as, for example, in broadcasting stations or post productions, a so called matrix switcher apparatus (matrix routing switcher apparatus) may be used for arbitrarily distributing a plurality of channels from these devices (VTRs) to outputs of a plurality of channels (editing rooms, etc.). Namely, as shown in FIG. 1, in the case of transmitting signals (video signals) on respective channels from, e.g., 32 VTRs 101 to 132 within a VTR room 100, e.g., with these signals being distributed over 8 channels to four editing rooms 151 to 154, signals from respective VTRs are first transmitted to a matrix switcher apparatus 140. Then, these signals are distributed and transmitted to the respective editing rooms by the matrix switcher apparatus 140.

In such a matrix switcher apparatus, the matrix size required varies diversely depending upon the scale of the system using the matrix switcher apparatus. Namely, as the number of VTRs or the number of editing rooms is increased, the matrix size of the matrix switcher apparatus becomes larger. The matrix size of the matrix switcher apparatus at this time is ordinarily expressed as the number of inputs (the number of input channels) ×the number of outputs (the number of output channels). For example, when the matrix size is expressed as 16×16, a matrix switcher apparatus having 16 input channels and 16 output channels is provided. Further, e.g., when the matrix size is expressed as 32×32, a matrix switcher apparatus having 32 input channels and 32 output channels is provided. Switches are arranged on the 16×16 or 32×32 cross points, respectively. When any switch is selected, a distribution of input channels is carried out.

Figure 2:
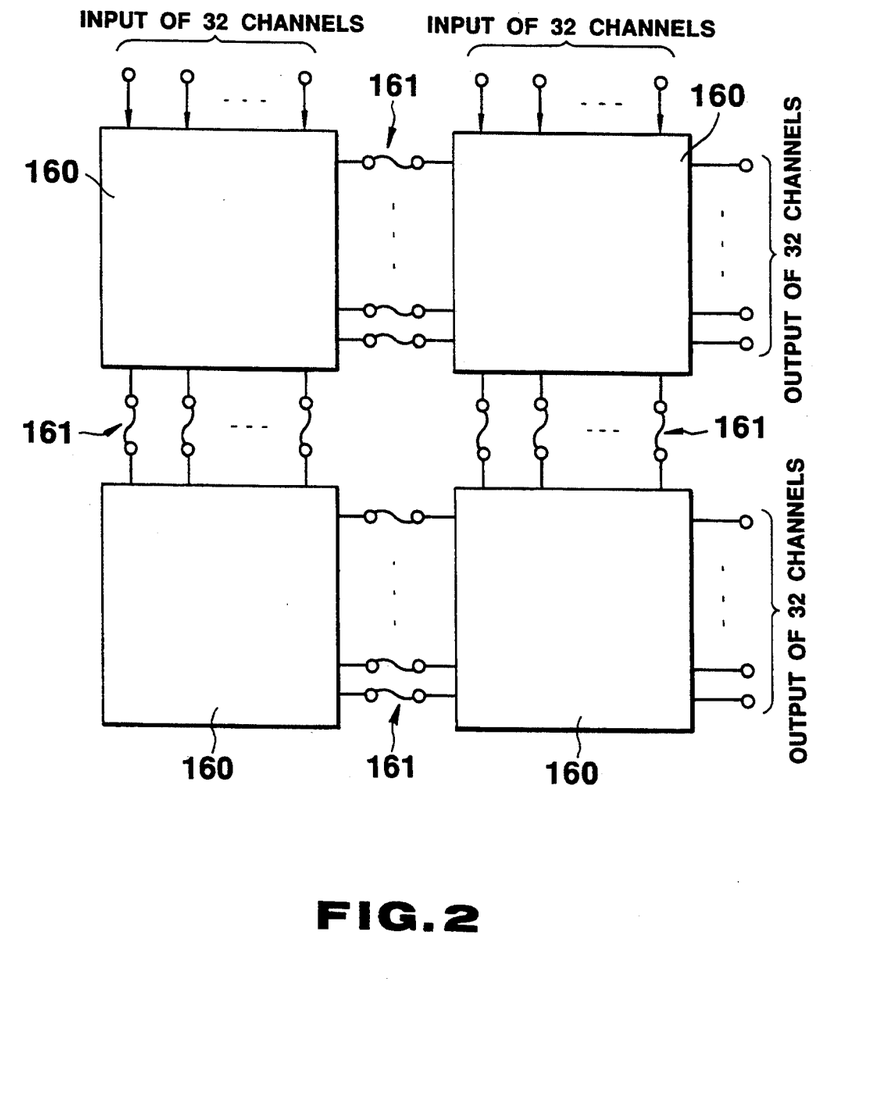
FIG. 2 is a block diagram showing the manner of connecting conventional matrix switcher apparatus to construct a matrix having a size of 64×64.

This matrix size ranges from 16×16 to 256×256. Hitherto, in order to cope with such various matrix sizes, a system of cascade-connecting basic units (e.g., 16×16 or 32×32) has been adopted to increase the scale of the matrix. Namely, this conventional cascade system uses both basic units for increasing the number of inputs and basic units for increasing the number of outputs to carry out the cascade connection, thus to increase the number of input channels, the number of output channels, and the number of cross point matrices. With reference to FIG. 2, in accordance with this cascade system basic units 160 of e.g., 32×32 would be used to constitute a matrix switcher apparatus of 64×64. Terminals of four basic units 160 of 32×32 are interconnected by cascade connections 161. Thus, a matrix switcher apparatus of 64×64 is constituted.

However, in the case of attempting to constitute, e.g., a matrix switcher apparatus of 256×256 by the conventional cascade system as described above, 64 basic units of 32×32 must be used. For this reason, in such a large scale system, the total size and cost of the system are greatly increased.

Further, since the conventional basic units of the matrix switcher apparatus only have a few kinds of sizes, e.g., 16×16 or 32×32, etc., it is difficult to desirably change the matrix scale. For example, it is difficult to constitute a matrix having a size smaller than that of the basic unit, or a size much larger than that of the basic unit.

OBJECT AND SUMMARY OF THE INVENTION

It is an object of the present invention to provide a matrix switcher apparatus which permits the system for the matrix switcher apparatus to be compact, and permits it to be constituted on various scales, while providing reduced cost.

The matrix switcher apparatus according to this invention is directed to a matrix switcher apparatus adapted to arbitrarily distribute a plurality of channel inputs to a plurality of channel outputs, wherein the matrix switcher apparatus has a cross point matrix therein adapted for connecting one matrix switcher unit to any other matrix switcher unit or units to carry out expansion of input/output, and wherein input and output terminals expandable up to a predetermined maximum number of channels are provided in the matrix switcher apparatus.

Further, the matrix switcher apparatus of this invention comprises a first cross point matrix including input terminals for a plurality of channels, and output terminals for at least some of the plurality of channels and for channels expandable to any other matrix switcher unit or units; and a second cross point matrix including input terminals for the at least some of the plurality of channels from the first cross point matrix and channels received from any other matrix switcher unit or units, and output terminals for at least some of the channels received by the matrix switcher apparatus. Here, the first and second cross point matrices may be comprised of at least a single substrate.

In accordance with this invention, since the cross point matrix for expansion of input/output can be provided within the apparatus, and input/output terminals expandable up to a predetermined maximum number of channels can be provided therein, it is possible to enlarge the matrix size up to the maximum number of channels. Further, since the first and second cross point matrices are able to carry out input/output of only some of the channels, the matrix size can be reduced. Accordingly, the matrix switcher apparatus can be connected to other matrix switcher apparatus by using the expansion channels. Thus, the matrix size can also be enlarged.

The aforementioned and other objects, features and advantages of this invention will become clear from the following description of the preferred embodiments thereof, taken in conjunction with the accompanying drawings.

DESCRIPTION OF THE PREFERRED EMBODIMENT

An embodiment to which this invention is applied will now be described with reference to the attached drawings.

Figure 3A:
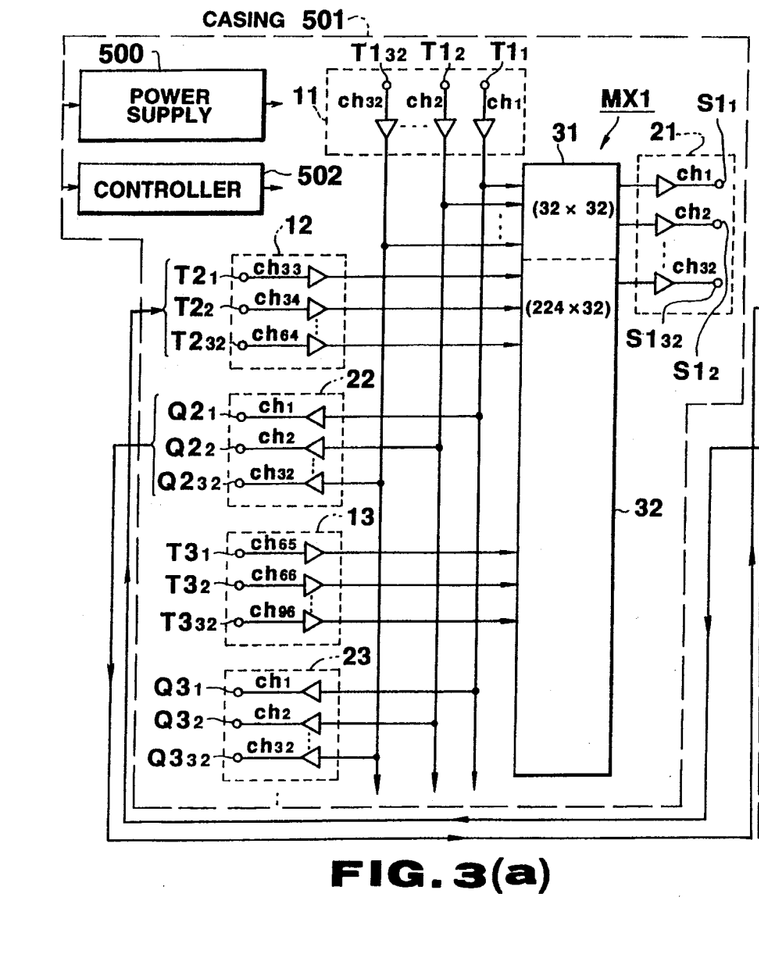
FIGS. 3(a) and 3(b) are a circuit diagram showing, in a block form, the outline of the configuration of a matrix switcher apparatus according to a first embodiment of this invention.
Figure 3B:
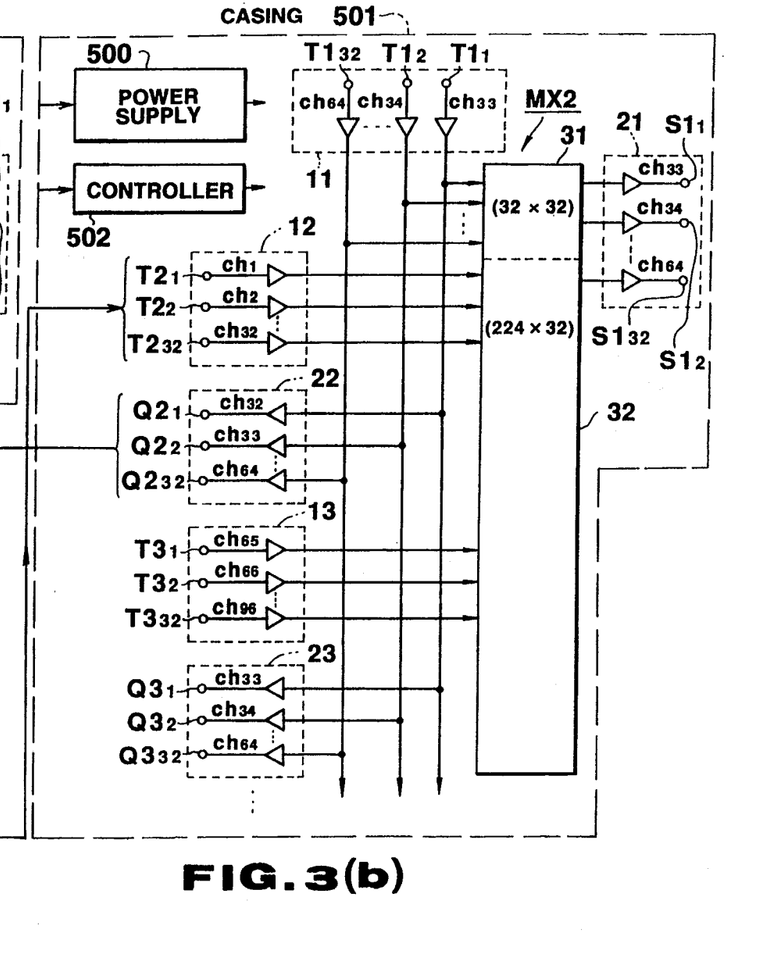

FIG. 3(a) is a block diagram showing the outline of the configuration of a matrix switcher apparatus of a first embodiment of this invention. FIG. 3(b) also shows the apparatus of the first embodiment. The apparatus of the first embodiment shown in FIGS. 3(a) and (b) is directed to matrix switcher units or arrangements MX1 and MX2 for arbitrarily distributing inputs (e.g., video or audio signals of 32 channels, etc.) through input terminals $T1_1$ to $T1_{32}$ to a plurality of channel outputs (32 channels) (output terminals $S1_1$ to $S1_{32}$) to deliver the distributed outputs. A cross point matrix 32 for connecting one matrix switcher unit MX2 to the other matrix switcher unit MX1 to carry out expansion of input/output is provided in the matrix switcher units MX1 and MX2. Further, an arrangement is employed in which expandable input terminals $T2_1$ to $T2_{32}$, $T3_1$ to $T3_{32}$ . . . , and expandable output terminals $Q2_1$ to $Q2_{32}$, $Q3_1$ to $Q3_2$, . . . up to a predetermined maximum number of channels (e.g., 256 channels) are provided in the matrix switcher unit MX1 and MX2.

In the matrix switcher unit MX1 of FIG. 3(a), the cross point matrix 31 has a matrix size of 32×32, and the cross point matrix 32 has a matrix size of 224×32. Accordingly, in the matrix switcher units MX1, an overall size of 256×32 is provided by the cross point matrix 31 and the cross point matrix 32 provided for expansion. Here, 32 input channels ch 1 to ch 32 delivered to respective input terminals T1 to $T1_{32}$ of an input terminal group 11 are transmitted to the cross point matrix 31. This cross point matrix 31 arbitrarily distributes these respective 32 input channels to provide distributed outputs from respective output terminals $S1_1$ to $S1_{32}$ of an output terminal group 21. Further, 32 input channels from the input terminal group 11 are outputted through the expandable output terminal $Q2_1$ to $Q2_{32}$, $Q3_1$ to $Q3_{32}$, . . . , $Q8_1$ . . . $Q8_{32}$ (indications of terminals $Q4_1$, to $Q4_{32}$, . . . , $Q8_1$ . . . $Q8_{32}$ being omitted from the Figure) of 7 expandable output terminal groups 22, 23, . . . , 28 (indications of terminal groups 24 to 28 also being omitted). Since 32 expandable output terminals are provided with respect to seven expandable output terminal groups, the total number of output terminals is equal to 224. Further, seven input terminal groups 12, 13, . . . 18 (indications of terminal groups 14 to 18 also being omitted) are connected to the expandable cross point matrix 32. Further, 32 channel input terminals $T2_1$ to $T2_{32}$, $T3_1$ to $T3_{32}$, . . . , $T8_1$ to $T8_{32}$ (indications of terminals $T4_1$ to $T4_{32}$, . . . $T8_1$ to $T8_{32}$ likewise being omitted) are arranged in each of these respective expandable input terminal groups. Accordingly, since 32 expandable input terminals are provided in each of the 7 expandable input terminal groups, the total number of input terminals is equal to 224.

In the apparatus of the first embodiment, by connecting the terminals of the expandable input and output groups of the matrix switcher apparatus to the expandable input/output terminals of another matrix switcher apparatus in accordance with this embodiment, expansion of the matrix size can be achieved. For example, in the case of carrying out a distribution of inputs to outputs by using only one apparatus of the first embodiment shown in FIG. 3(a), 32 channels delivered to the input terminal group 11 are distributed to the output terminal group 21 by using the cross point matrix 31 having a matrix size (32×32). By connecting the expandable input/output terminal groups of another matrix switcher apparatus in accordance with this embodiment with the expandable input/output terminal groups of the FIG. 3(a) apparatus, a matrix size of 32×32 or more can be realized. For example, where the apparatus of this embodiment and another single matrix switcher apparatus in accordance with this embodiment are connected to each other, a matrix size of 64×64 is provided. Further, where the apparatus of this embodiment and seven matrix switcher apparatus in accordance with this embodiment are connected to each other, a matrix having a size of 256×256 can be realized.

A description is now provided of an apparatus wherein the matrix switcher of FIG. 3(a) is interconnected with another matrix switcher apparatus in accordance with the same embodiment to realize a matrix having a size of 64×64. The matrix switcher unit MX2 of FIG. 3(b) is constructed in the same manner as the matrix switcher unit MX1 of FIG. 3(a).

Inputs of respective channels 1 ch to 32 ch are delivered to the input terminals group 11 of the matrix switcher apparatus MX1, and inputs of respective channels ch 33 to ch 64 are delivered to the input terminal group 11 of the matrix switcher apparatus MX2. Here, terminals of the expandable output terminal group 22 of the apparatus MX1 are connected to respective terminals of the expandable input terminal group 12 of the matrix switcher unit MX2. Further, respective terminals of the expandable input terminal group 12 of the matrix switcher apparatus MX1 are connected to terminals of the expandable output terminal group 22 of the matrix switcher unit MX2. Namely, the signals of channels ch 1 to ch 32 delivered to the unit MX1 are transmitted to the expandable input terminal group 12 of the matrix switcher unit MX2 through the expandable output terminal group 22 of the unit MX1. Further, the signals of channels ch 33 to ch 64 delivered to the matrix switcher unit MX2 are transmitted to the expandable input terminal group 12 of the matrix switcher unit MX1 through the expandable output terminals group 22 of the unit MX2. For this reason, for example, when the signals of channel ch 1 are distributed by the matrix switcher unit MX1 to its output terminal $S1_{32}$ to provide a distributed output, the signals of channel ch 1 delivered to the input terminal $T1_1$ of the matrix switcher unit MX1 are distributed to its output terminal $S1_{32}$ by the selection of a corresponding switch in the cross point matrix 31 of the unit MX1. Further, for example, when the signals of channel ch 64 are distributed by the matrix switcher unit MX2 to its output terminal $S1_1$ to provide a distributed output, the signals of channel ch 64 delivered to the input terminal $T1_{32}$ thereof are distributed to its output terminal $S1_1$ by the selection of a corresponding switch in its cross point matrix 31. As another example, when distributing signals on channel ch 2 received at the matrix switcher unit MX1 to output terminal $S1_2$ of the matrix switcher unit MX2 to output distributed outputs, the channel ch 2 signals received by the input terminal T1$_2$ of the matrix switcher unit MX1 are delivered to the cross point matrix 32 of the unit MX2 through the output terminal Q2$_2$ of the expandable output terminal group 22 of the matrix switcher unit MX1, and through the input terminal T2$_2$ of the expandable input terminal group 12 of the matrix switcher unit MX2. When corresponding switches in the cross point matrices 32 and 31 of the unit MX2 are selected, the abovementioned signals are distributed to the output terminal S1$_2$ of the unit MX2.

In the above-described case of FIG. 3, there is shown an example of the connection of two matrix switcher units. For example, in another embodiment, three matrix switcher units are connected to each other. At this time, a matrix size of 96×96 can be realized. In this case, inputs of respective channels ch 65 through ch 96 are delivered to the input terminal group 11 of a third matrix switcher unit MX3 (which also is omitted from the drawing of figures). The connection between these three matrix switcher units MX1, MX2 and MX3 is as follows. The connection between the expandable output terminal groups 12 and 22 of the matrix switcher units MX1 and MX2 is the same as that in the case shown in FIG. 3. Here, the expandable input terminal group 13 of the matrix switcher unit MX1 is connected to each of the input terminal groups of the expandable output terminal group 23 of the matrix switcher unit MX3, and the expandable output terminal group 23 of the matrix switcher unit MX1 is connected to the expandable input terminal group 13 of the unit MX3. Further, the expandable input terminal group 13 of the matrix switcher apparatus MX2 is connected to the expandable output terminal group 22 of the matrix switcher unit MX3. In addition, the expandable output terminal group 23 of the matrix switcher unit MX2 is connected to the expandable input terminal group 12 of the unit MX3.

In the case described above where three matrix switcher units are connected to distribute, e.g., signals on channel ch 32 delivered at the matrix switcher unit MX1 to the output terminals S1$_1$ of the third matrix switcher unit MX3 of this embodiment to provide the distributed outputs, the signals on channel 32 received at the input terminal T1$_{32}$ of the matrix switcher unit MX1 are transmitted to the cross point matrix 32 of the unit MX3 through the output terminal Q3$_{32}$ of the expandable output terminal group 23 of the matrix switcher unit MX1, and through the input terminal T2$_{32}$ of the expandable input terminal group 13 of the matrix switcher unit MX3. When corresponding switches in the cross point matrices 32 and 31 of the unit MX3 are selected, the above-mentioned signals are distributed to the output terminal S1$_1$ of the unit MX3.

Meanwhile, in the previously described conventional matrix switcher apparatus, basic units having a matrix size of 16×16 or 32×32 are ordinarily accommodated within a standardized casing, such as, for example, so called EIA (Electronic Industries Association) unit, etc. All other components, e.g., power supply and/or controller (CPU), etc. for the units switch are provided within the casing. For this reason, in order to realize a matrix size of, e.g., 256×256 by using this conventional apparatus, as previously described, 64 basic units in 64 separate casings. As a result, the system necessarily becomes large. Since casings and power supplies, etc. are required for each unit, the cost is increased. On the contrary, in the matrix switcher unit of this embodiment, one matrix switcher unit has a matrix size of 256×32, and the above-mentioned power supply, and controller, etc. are arranged in this 256×32 unit. Where the EIA unit is used, the size of the casing for the apparatus of this embodiment can be kept to a size substantially only two times larger than that of the conventional casing. For this reason, even though seven units are necessary for realizing a matrix size of 256×256, the overall size of the system for the matrix switcher apparatus of this embodiment can be reduced to about (7×2)/64 of the size of a 256×256 conventional matrix apparatus. Further, since it is sufficient to use casings and/or power supplies, etc. corresponding to only seven units, the cost can be held to a low value.

For the above-described reasons, in the apparatus of the first embodiment, by connecting seven matrix switcher units at the most, a matrix size of 256×256 can be realized. Even in this case, the scale of the system can be made smaller than that of the conventional apparatus, and the cost can be reduced to a greater degree.

Figure 4:
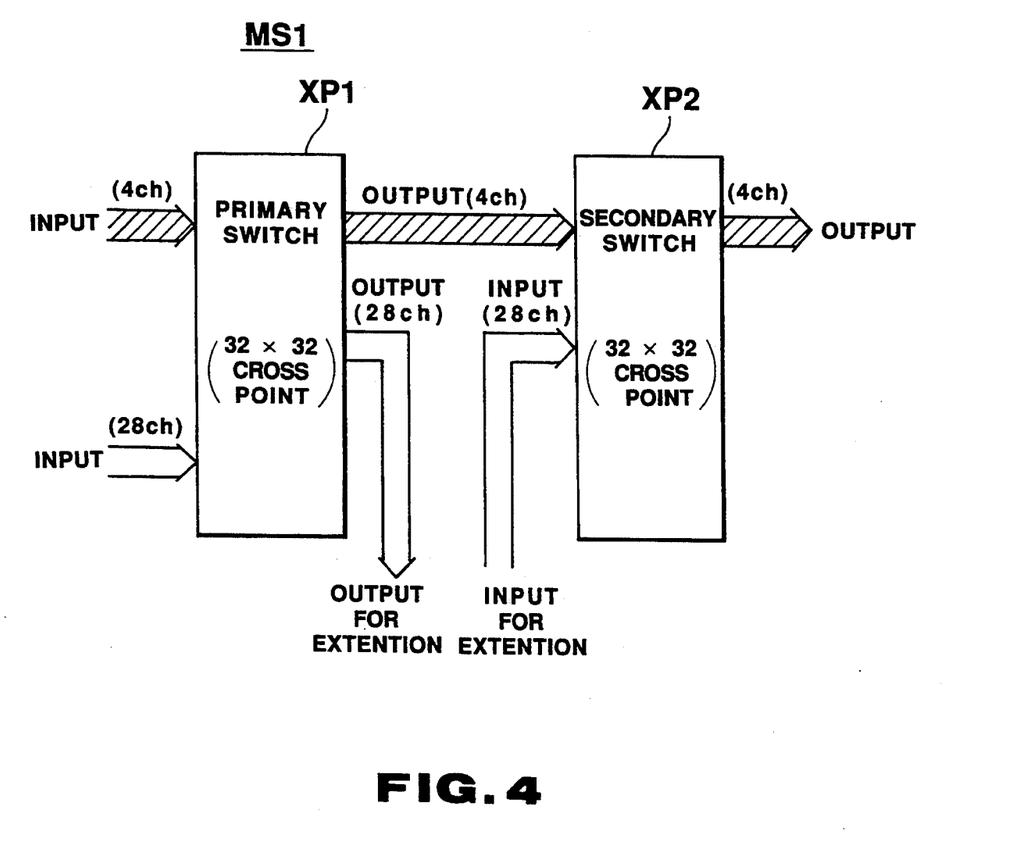
FIG. 4 is a block diagram showing the outline of the configuration of a matrix switcher apparatus according to a second embodiment of this invention.

FIG. 4 is a block diagram showing the outline of the configuration of a matrix switcher apparatus according to a second embodiment of this invention. The matrix switcher unit MS1 of the second embodiment shown in FIG. 4 comprises a primary switch XP1 serving as a first cross point matrix including input terminals for a plurality of channels (e.g., 32 channels), first output terminals for at least a partial set (e.g., 4) of the plurality of channels and second expandable output terminals for the remaining channels (28 channels) coupled to another matrix switcher unit MS2 (which has the same configuration as the matrix switcher unit MS1 and its indication is omitted from FIG. 4), and a secondary switch XP2 serving as a second cross point matrix including input terminals coupled with the first output terminals of the primary switch XP1 to receive the partial set of channels (4 channels in this example) from the primary switch XP1 and expandable channels (28 channels) from the other matrix switcher unit MS2, and output terminals for a partial set of channels (4 channels) of the matrix switcher unit MS1. Here, the above-mentioned primary and secondary switches XP1 and XP2 can be constructed at least on a single substrate.

The FIG. 4 embodiment enables an arrangement in which eight substrates on which the primary and secondary switches XP1 and XP2 are arranged for arbitrarily distributing inputs of 32 channels to provide the distributed outputs. The switches XP1 and XP2 are arranged on a single substrate of the matrix switcher unit MS1 and both have, e.g., a matrix size of 32×32. Here, signals on four channels ch 1 to ch 4 are delivered to four of the 32 input terminals of the primary switch XP1. Further, 4 channels from other respective ones of the seven remaining substrates (28 channels ch 5 to ch 32 in total) are delivered to the remaining 28 input terminals. At this time, the primary switch XP1 is operative to select up to 4 channels from these 32 input channels by switch selection to output selected ones thereof. The four channels output by the primary switch XP1 are transmitted to the secondary switch XP2. Further, the remaining 28 channels of the primary switch XP1 are connected to 28 expandable output terminals and thereby to the other matrix switcher unit MS2, respectively. In addition, four channels output from the primary switch XP1 are delivered to the secondary switch XP2, and 28 channel outputs from the expandable output terminals of the other matrix switcher unit MS2 are delivered to the secondary switch XP2 through expandable output terminals. Namely, this secondary switch XP2 is operative to select up to 4 arbitrary channels, by switch selection, from a total of 32 channels including 4 channel inputs from the primary switch XP1 and 28 channel inputs from the other matrix switcher apparatus MS2 to output them. A matrix size of 32×32 is realized by eight such substrates.

Figure 5:
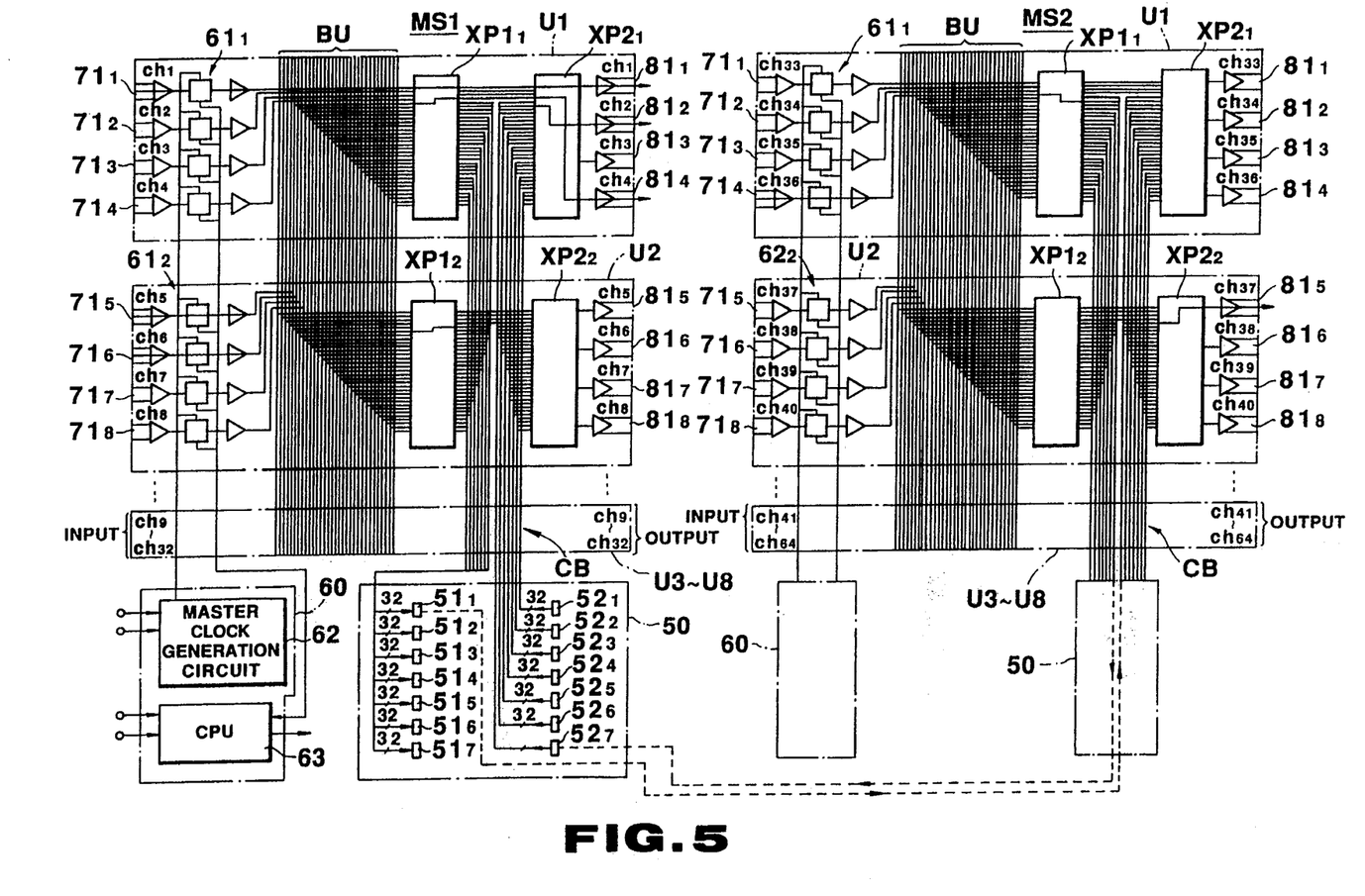
FIG. 5 is a circuit diagram showing, in block form, an actual configuration of the second embodiment.

FIG. 5 shows an actual configuration of the above-described matrix switcher apparatus of the second embodiment, and an example in which a matrix size of 64×64 is realized by connecting two matrix switcher units.

In the matrix switcher unit MS1 of FIG. 5, the eight substrates described above are used to realize a matrix size of 32×32. Further, the matrix switcher unit MS1 and the matrix switcher unit MS2 (having the same structure as the unit MS1) are connected to realize the matrix size of 64×64.

In FIG. 5, primary switches $XP1_1$ TO $XP1_8$ on respective substrates U1 to U8 (indications of actual configurations of U3 to U8 are omitted) of the matrix switcher apparatus MS1 each receives 32 input channels including 4 channels through respective ones of input terminals $71_1$ to $71_{32}$ (terminal $71_9$ and succeeding terminals being omitted) and 4 respective channels (28 channels in total) from each of the other seven substrates through a unit interface bus BU to select and output 4 of these 32 channels, respectively. Here, the above-mentioned four channel inputs to the respective primary switches $XP1_1$ to $XP1_8$ are delivered through corresponding buffer circuits $61_1$ to $61_8$ (indications of circuit $61_3$ and circuits succeeding thereto being omitted) each comprised of an amplifier, or a latch circuit, etc. Further, outputs from a control circuit 60 comprised of a master clock generation circuit 62 and a CPU 63 are delivered to the latch circuits $61_1$ to $61_8$, respectively. The CPU 63 also outputs a control signal for switch selection at the primary and secondary switches. Further, the remaining 28 channels output by the respective primary switches $XP1_1$ to $XP1_8$ are transmitted to an expandable input terminal group of an expandable input/output terminal section 50 of the other matrix switcher unit MS2 from a respective expandable output terminal group of expandable output terminal groups $51_1$ to $51_7$ of an expandable input/output section 50 through the bus CB to provide an expandable interface. Here, seven expandable output terminal groups $51_1$ to $51_7$ of the expandable input/output terminal section 50 are each comprised of terminals corresponding to 32 channels, and each can be connected to a matrix switcher unit in accordance with this embodiment. Accordingly, a maximum matrix size of 256×256 can be realized including 32 channels at the matrix switcher unit MS1 and a total of 224 channels at the other matrix switcher units connected to the seven expandable output terminal groups $51_1$ to $51_7$. Further, secondary switches $XP2_1$ to $XP2_8$ (indications of switch $XP2_3$ and switches succeeding thereto being omitted), receive respective 4 channel outputs from the primary switches $XP1_1$ to $XP1_8$, and respective 28 channel outputs from an expandable output terminal group of the expandable input/output terminal section 50 of the other matrix switcher unit MS2. At the secondary switches $XP2_1$ to $XP2_8$, up to 4 arbitrary channels are output, by switch selection, through output terminals $81_1$ to $81_{32}$ (indications of terminal $81_9$ and terminal succeeding thereto being omitted) from 32 input channels including 4 channels input from the corresponding one of primary switches $XP1_1$ to $XP1_8$ plus 28 additional channels provided thereto.

Here, for example, in the case where signals on channel ch 1 received by the input terminal $71_1$ of the substrate $U_1$ in the matrix switcher unit MS1 are output to the output terminal $81_1$ of the unit MS1, signals provided over channel ch 1 through respective elements of the buffer circuit $61_1$ are transmitted to the primary switch $XP1_1$. After switch selection is carried out at the primary switch $XP1_1$, (while respective primary switches of the other substrates are all places in an OFF state), the abovementioned signals are transmitted to the secondary switch $XP2_1$. At this switch, swithc selection is carried out in the same manner as stated above and the signals are then output from the output terminal $81_1$. Further, for example, in the case where signals provided over channel ch 5 received by the input terminal $71_5$ of the substrate U2 at the matrix switcher unit MS1 are output by the output terminal $81_4$ of the substrate U1 of the unit MS1, the channel ch 5 signals are transmitted to the secondary switch $XP2_1$ of the substrate U1 as the result of switch selection carried out at the primary switch $XP1_1$ of the substrate U1 (while primary switches of the other substrates are all placed in an OFF state). Also at the secondary switch $XP2_1$, switch selective processing is carried out. The signals thus processed are output from the output terminal $81_4$. Further, for example, in the case where signals on channel ch 6 received by the input terminal $71_6$ of the substrate U2 in the matrix switcher unit MS1 are output by the output terminal $81_5$ of the substrate U2 of the matrix switcher unit MS2, the channel ch 6 signals are transmitted to the secondary switch $XP2_2$ of the substrate U2 of the unit MS2 through the expandable output terminal group $51_1$ of the expandable input/output terminal section 50, and through a corresponding expandable input terminal group of the expandable input/output terminal section 50 of the matrix switcher unit MS2 as the result of switch selection at the primary switch $XP1_2$ of the substrate U2 while the primary switches of the other substrates are all placed in an OFF state). At the secondary switch $XP2_2$, switch selection is carried out, and signals thus selected are output by the output terminal $81_5$. In addition, where signals on channel ch 36 received by the input terminal $71_4$ of the substrate U1 in the matrix switcher unit MX2 are output by the output terminal $81_2$ of the substrate U1 of the matrix switcher unit MS1, the channel ch 36 signals are transmitted to the secondary switch $XP2_1$ of the substrate U1 in the unit MS1 through a corresponding expandable output terminal group of the expandable input/output terminal section 50 of unit MS2, and through, e.g., a corresponding expandable input terminal $52_7$ of the expandable input-/output terminal section 50 of the matrix switcher unit MS1 as the result of switch selection carried out at the primary switch $XP1_1$ of the substrate U1 in the matrix switcher unit MS2 (while the primary switches of the other substrates are all placed in an OFF state). At the secondary switch $XP2_1$, switch selection is then carried out. Such signals thus selected are output by the output terminal $81_2$.

In the above-described matrix switcher apparatus of the second embodiment, while eight substrates are used to realize a matrix size of 32×32, e.g., a single substrate may be used alone to realize a small scale matrix switcher apparatus having a matrix size of 4×4. Further, by connecting a plurality of switcher units of the second embodiment, the matrix size can be expanded.

For example, by connecting only eight matrix switcher units of this embodiment to each other, a maximum matrix size of 256×256 can be provided. Since the maximum matrix size of 256×256 can be provided by only eight units in this way, the cost can be reduced.

The matrix switcher apparatus of this invention is adapted to provide a cross point matrix for connecting one switcher unit to another switcher unit to expand input/output, and to provide input/output terminals which are expandable up to a predetermined maximum number of channels. Accordingly, for example, even if a matrix size of 256×256 is employed, the overall scale of the system can still be compact, and the cost can be reduced. Further, the matrix switcher apparatus of this invention is adapted so that it comprises a first cross point matrix including input terminals for a plurality of channels and output terminals for at least some of the plurality of channels along with channels expandable to other switcher units, and a second cross point matrix having one group of input terminals coupled to the output terminals of the first cross point matrix and a second group of input terminals for receiving channels from other switcher units, and output terminals fewer in number than the input channels of the apparatus. Accordingly, this apparatus can provide a small matrix size, such as, for example, 4×4 as well as a large matrix size, such as, for example, 256×256. In addition, even if a maximum matrix size of, e.g., 256×256 is employed, the overall system can be compact, and the cost can be reduced.

What is claimed is:

1. A matrix switcher apparatus having at least first and second matrix switcher units for selectively distributing input signals from a plurality of input channels to a plurality of output channels, each said matrix switcher unit comprising:
   first input means for receiving the input signals from a respective group of said input channels;
   a first cross point matrix for selectively distributing said input signals from said input means to a plurality of output terminals coupled to respective ones of said output channels;
   output means receiving said input signals directly from said input means for outputting the received input signals to each other matrix switcher unit;
   second input means for receiving input signals from said output means of each other matrix switcher unit; and
   a second cross point matrix receiving the input signals from said second input means for supplying such received input signals to said first cross point matrix so as to selectively distribute said input signals from said each other matrix switcher unit received by said second input means to said output terminals.

2. A matrix switcher apparatus according to claim 1, in which each said matrix switcher unit further comprises a controller for controlling the respective first and second cross point matrixes, a power supply and a casing, each of the respective controller and power supply being arranged in the casing of the respective matrix switcher unit.

3. A matrix switcher apparatus according to claim 1, in which each said matrix switcher unit further comprises a casing, in which the first and second cross point matrixes of the respective matrix switcher unit are arranged in the casing of the respective matrix switcher unit.

4. A matrix switcher apparatus having at least first and second matrix switcher units for selectively distributing input signals in a plurality of input channels to a plurality of output channels, each said matrix switcher unit comprising:
   first cross point matrix means including a first group of input terminals for receiving the input signals in said plurality of input channels for selectively distributing said input signals to a first group of output terminals and to a second group of output terminals arranged for coupling to each other matrix switcher unit, and
   second cross point matrix means including a second group of input terminals coupled to said first group of output terminals and a third group of input terminals arranged for coupling to said each other matrix switcher unit for distributing the input signals received by said second group of input terminals from said first group of output terminals and signals received by said third group of input terminals from said each other matrix switcher unit to a predetermined number of output channels which is less than the number of said plurality of input channels.

5. A matrix switcher apparatus according to claim 4, wherein the first and second cross point matrix means of each said matrix switcher unit are fabricated on a respective single substrate.

6. A matrix switcher apparatus according to claim 4, in which each said matrix switcher unit further comprises control circuit means for controlling the respective first and second cross point matrix means.

7. A matrix switcher apparatus according to claim 4, in which said apparatus includes a third matrix switcher unit.

* * * * *